(12) United States Patent
Strutt et al.

(10) Patent No.: US 6,295,874 B1
(45) Date of Patent: Oct. 2, 2001

(54) APPARATUS FOR DETERMINING A PHYSICAL PROCESS VARIABLE OF A MEDIUM

(75) Inventors: Bernd Strutt, Steinen; Bernhard Michalski, Maulburg, both of (DE)

(73) Assignee: Endress + Hauser GmbH & Co., Maulburg (DE)

( * ) Notice: Subject to any disclaimer, the term of this patent is extended or adjusted under 35 U.S.C. 154(b) by 0 days.

(21) Appl. No.: 09/489,076

(22) Filed: Jan. 21, 2000

Related U.S. Application Data

(63) Continuation of application No. PCT/EP99/06585, filed on Sep. 7, 1999.

(51) Int. Cl.$^7$ ............................. G01H 5/00; G01F 23/00; G01F 1/66
(52) U.S. Cl. ...................... 73/597; 73/290 V; 73/861.25
(58) Field of Search ................... 73/290 V, 596, 73/597, 602, 627, 629, 861.18, 861.21, 861.25; 367/908

(56) References Cited

U.S. PATENT DOCUMENTS

| 4,700,569 | 10/1987 | Michalski et al. . |
| 4,718,025 | 1/1988 | Minor et al. . |
| 4,847,623 | 6/1988 | Jean et al. . |
| 5,319,972 | * 6/1994 | Oblak et al. ........................ 73/290 R |
| 5,651,286 | * 7/1997 | Champion et al. ................ 73/290 V |
| 5,880,698 | 3/1999 | Burger . |
| 5,884,231 | 3/1999 | Perdue et al. . |

FOREIGN PATENT DOCUMENTS

| 0 340 953 A2 | 11/1989 | (EP) . |
| 2 300 265 | 10/1996 | (GB) . |

\* cited by examiner

*Primary Examiner*—Richard A. Moller
(74) *Attorney, Agent, or Firm*—Bose McKinney & Evans LLP

(57) ABSTRACT

An apparatus for determining a physical process variable of a medium (2) which can be used in conjunction with various sensor types, the sensors having in common that they determine a process variable by means of a delay-time method. The apparatus has a sensor (4), a sensor-specific application unit (5) and an evaluation unit (6), which is essentially independent of the sensor type used, the sensor (4) being assigned a transmitting/receiving unit (7), the transmitting unit (7a) transmitting measuring signals in the direction of the medium (2) and the receiving unit (7b) receiving the measuring signals influenced by the interaction with the medium (2), and the application unit (5) being designed in such a way that it provides measurement data, independently of the type of sensor (4) used, from which the evaluation unit (6) determines the physical process variable using a delay-time method by means of a uniform evaluation algorithm.

22 Claims, 3 Drawing Sheets

APPARATUS FOR DETERMINING A PHYSICAL PROCESS VARIABLE OF A MEDIUM

This application is a continuation of PCT/EP99/06585 filed Sep. 7, 1999.

FIELD OF THE INVENTION

The invention relates to an apparatus for determining a physical process variable of a medium. In connection with the present invention, the concept "physical process variable" is to be understood in particular to mean the filling level of a medium in a container or the flow of a medium through a line. However, the apparatus according to invention can not only be used for these explicitly mentioned process variables but can be extended to any desired process variables determined by means of a delay-time method.

BACKGROUND OF THE INVENTION

Both in the case of the "genuine radar method" and in the case of the Time Domain Reflectometry (TDR) method, measuring signals are transmitted in the direction of the surface of a medium and at least partially reflected at the surface of the medium as so-called echo signals. The reflected echo signals are detected and evaluated by means of a delay-time method. The main difference between the genuine radar method and the TDR method is that in the first case the electromagnetic waves, or the sound or ultrasound waves are freely emitted, while in the case of the TDR method the electromagnetic or acoustic measuring signals propagate in a directed manner along an element guiding the measuring signals. By evaluation of the amplitude values and possibly the phase values of the echo signals, the filling level in the container is determined by means of a delay-time method. Both the pulsed radar method, in which the echo signals are emitted in a pulsed manner, and the FMCW method, in which continuous waves are frequency-modulated in a periodically linear manner, for example with a sawtooth voltage, may be used. In the case of the TDR method, usually steep-edged delta pulses are sent to the conductive element.

Delay-time methods use the physical law according to which the transit distance is equal to the product of the delay time and the propagation velocity. In the case of filling level measurement, the transit distance corresponds to twice the distance between the antenna and the surface of the filled product. The actual useful echo signal and its delay time arc usually determined on the basis of the so-called echo function or the digital envelope curve, the envelope curve reproducing the amplitudes of the echo signals as a function of the "antenna - surface of the filled product" distance. The filling level itself is then obtained from the difference between the known distance of the antenna from the bottom of the container and the measured distance of the surface of the filled product from the antenna. Analogous considerations apply to the determination of the mass how through a line.

Instruments of the type referred to above are manufactured and sold by Endress+Hauser in the area of filling level measurement and flow measurement. For instance, the product designation "Mikropilot" stands for a sensor which freely emits microwaves; "Prosonic" or "Prosonic Flow" identify sensors which operate on the basis of ultrasound waves, and "Levelflex" designates a TDR sensor.

SUMMARY OF THE INVENTION

The object of the invention is to provide an apparatus which can be used in conjunction with various sensors, the sensors having in common that they determine a process variable by means of a delay-time method.

The object is achieved by the apparatus being made up of the following component parts: a sensor, a sensor-specific application unit, and an evaluation unit which is essentially independent of the sensor type used. The sensor being assigned a transmitting/receiving unit, the transmitting unit transmitting measuring signals in the direction of the medium and the receiving unit receiving the measuring signals influenced by the interaction with the medium. The application unit being designed in such a way that it processes the measuring signals and provides measurement data which is independent of the sensor type used. The evaluation unit processes the measurement data and determines the physical process variable using a delay-time method by means of a uniform evaluation algorithm. By dividing up of the individual components of the sensor, one effect that is consequently achieved according to invention is, for example, that now just one evaluation unit can be used universally for any desired sensor type based on the delay-time method. The application unit is also designed such that it can largely be used universally and likewise exhibits only slight deviations, dependent on the sensor type used.

According to an advantageous embodiment of the apparatus according to the invention, it is provided that a communication unit, which is independent of the sensor type used, is provided for the data exchange with a remote process control station. In addition to the application and evaluation unit, which is essentially the same for all common sensor types in the area of no-contact filling level or flow measurement, this embodiment also standardizes the area concerning the communication between the sensor and a remote process control station.

According to a preferred embodiment of the apparatus according to the invention, the communication unit and the process control station are preferably connected via a serial bus, the communication unit having interfaces which are configured for data exchange by means of different transmission standards. As examples of such transmission standards, the Profibus PA, the Fieldbus Foundation Protocol or the HART Protocol may be mentioned.

As mentioned previously, an advantageous development of the apparatus according to the invention concerns a sensor which freely emits electromagnetic waves or acoustic waves in the direction of the medium or guides them in the direction of the medium via a conducting element.

In the case of a microwave sensor, it is provided according to a preferred embodiment that the application unit is assigned a high-frequency module, which generates the high-frequency measuring signals and subsequently transforms them into the low-frequency measuring range. In particular, it is proposed that the high-frequency module is part of the sensor-specific application unit. A preferred embodiment of the apparatus according to the invention providing that the high-frequency module and the application unit are integrated into the sensor.

An advantage of the transformation of the high-frequency measuring signals into the low-frequency range is that relatively slow and consequently low-cost electronic components can be used for the signal acquisition and/or signal evaluation. An essential prerequisite for time dilation or time delay by means of sequential sampling is a constant time difference between two successive sampling points. Known methods which satisfy this prerequisite are based on the mixer principle and the ramp principle.

It is possible within the scope of the apparatus according to the invention for the application unit also to be of a standard design for all types of sensor. It is preferred, however, to dispense with this, since in the case of ultrasound sensors the high-frequency module represents a superfluous and relatively expensive additional assembly. Consequently, if it is already known at the time of production that the application unit and the evaluation unit will be assigned exclusively to an ultrasound sensor, the high-frequency module is not integrated into the application unit for reasons of reducing cost.

As mentioned previously, the process variable to be measured is preferably the filling level of a medium in a container or the flow of a medium through a line.

According to an advantageous and cost-saving development of the apparatus according to the invention, at the sensor-specific application unit there is respectively provided an interface via which, in the case of an ultrasound sensor, the transmit frequency and the transmit pulse duration are transferred to the transmitting unit; in the case of a microwave sensor or a sensor which guides the microwaves in the direction of the medium by means of a conducting element, the high-frequency module is activated via the interface.

To save memory space and computing time, a preferred embodiment of the apparatus according to the invention provides that the evaluation unit samples the measuring signals influenced by the medium within a first measuring range at a first sampling frequency, the first sampling frequency defining a first distance resolution of the measuring signals influenced by the medium, and that the evaluation unit samples the measuring signals influenced by the medium within at least one second measuring range at a second sampling frequency, the second sampling frequency corresponding to a second distance resolution of the measuring signals influenced by the medium, and tile measuring ranges and the sampling frequencies being chosen such that the following two conditions are simultaneously satisfied: the second measuring range is a subrange of the first measuring range, and the second sampling frequency is greater than the first sampling frequency.

It is further provided that, for determining the filling level of the medium in the container, the evaluation unit evaluates a useful echo signal, which represents the portion of the measuring signal reflected at the surface of the medium, with respect to a system-dependent reference echo signal, the system-dependent reference signal representing the portion of the measuring signal that occurs at the transition to the transmitting unit or within the transmitting unit on account of reflections.

An advantageous embodiment of the apparatus according to the invention additionally proposes that the evaluation unit chooses the entire measuring range as the first measuring range, the entire measuring range covering the range between the minimum filling level and the maximum filling level of the medium in the container, and that the evaluation unit uses as further measuring ranges at least one selected range in the vicinity of the useful echo signal and of the reference echo signal.

An entire-range measurement is advisable in order to obtain an overview of the entire range and consequently also to cover all echo signals, in particular the interference echo signals as well. It is additionally also appropriate if, for example, in the course of filling level measurement the surface of the medium moves greatly and the filling level changes quickly. The high-resolving measurement within a subrange serves the purpose of increasing the distance resolution when the filling level surface is calm and consequently - again with respect to filling level measurement - making very accurate statements about the respective filling level of the medium in the container. It is of course possible to switch back and forth between the two measuring principles as desired: if the surface is essentially calm, the subrange measurement is used; if the surface is moving, the entire-range measurement is used.

BRIEF DESCRIPTION OF THE DRAWINGS

The invention is explained in more detail with reference to the following figures, in which.

DETAILED DESCRIPTION OF THE PREFERRED EMBODIMENTS

Figure 1:
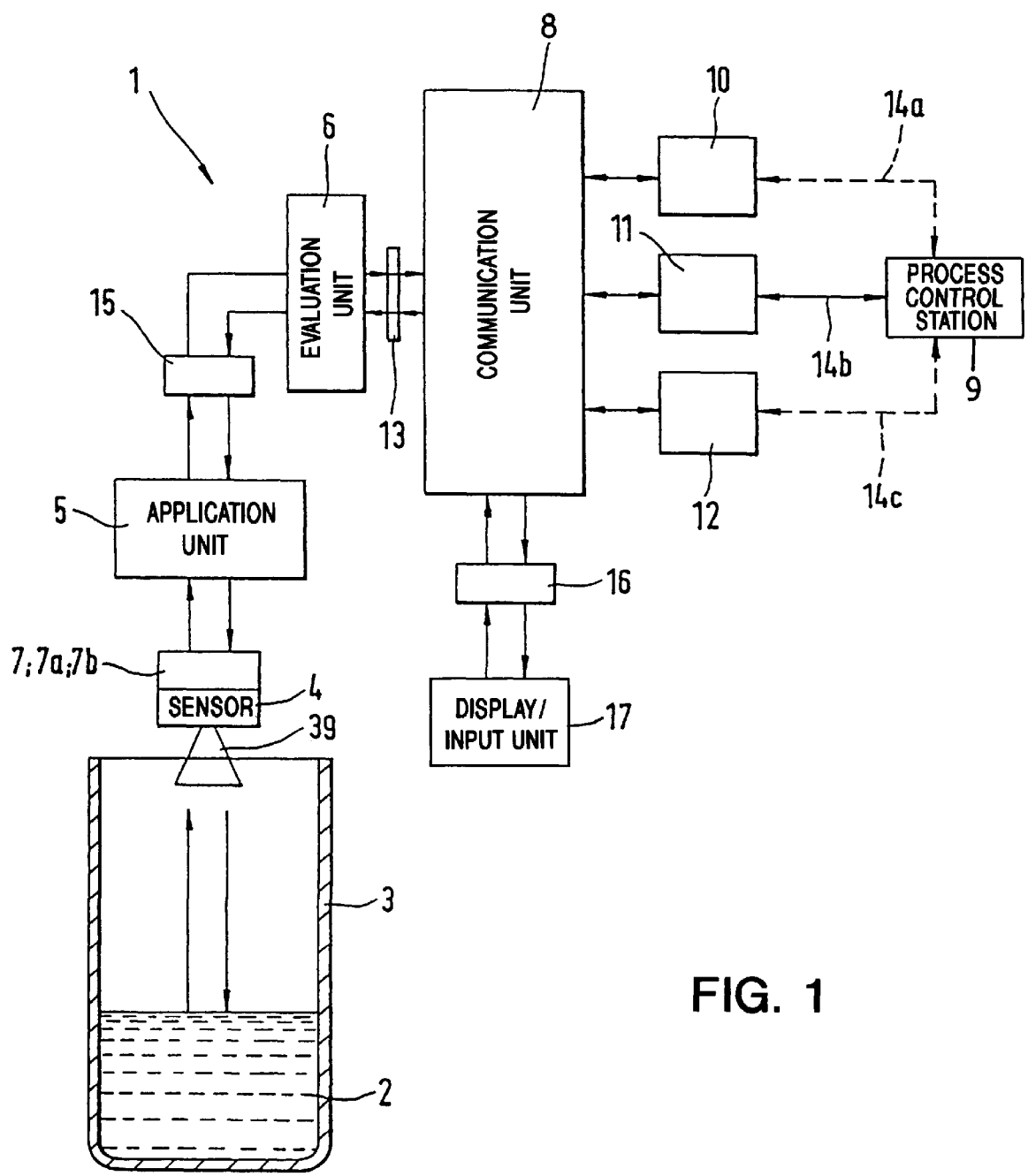
FIG. 1 shows a schematic representation of the individual components of an advantageous embodiment of the apparatus according to the invention and FIG. 2 shows a block diagram of a preferred embodiment of the apparatus according to the invention with a high frequency module.

FIG. 1 shows a schematic representation of the individual components of an advantageous embodiment of the apparatus according to the invention, which is used for filling level measurement. A medium 2 is attained in a container 3. An-angled above the maximum possible filling level of the medium 2, in the container 3, is a sensor 4 which freely emits measuring signals via an antenna 39 in the direction of the surface of the medium 2. The transmitting and receiving of the measuring and echo signals takes place by means of a transmitting/receiving unit 7 which includes a transmitting unit 7a and a receiving unit 7b. Connected to the transmitting/receiving unit 7 is an application unit 5 which usually has a construction that is dependent on the type of sensor 4 that is used.

The application unit 5 is connected to an evaluation unit 6 via an application unit/evaluation unit interface 15. The evaluation unit 6 has a standard construction that is independent of the type of sensor 4 that is used. In the evaluation unit 6, the momentary filling level in the container 3 is determined on the basis of the echo signals received. The evaluation unit 6 is connected to a communication unit 8 via an evaluation unit/communication unit interface 13. The interface 13 is the same for all sensor types that can be used in connection with the present invention. The operating variables relevant to the finding of the echo signal and the evaluation of the measuring signals are passed on from the communication unit 8 via the interface 13 to the evaluation unit 6. The communication unit 8 receives the operating variables either via a display/input unit 17 or via an interface 10, 11, 12 from a process control station 9. These operating variables are, for example, the minimum and maximum measuring range, the distance resolution or the filter variables. The evaluation unit 6 passes on, for example, calculated and standardized filling level data via the interface 13 to the communication unit 8.

In addition to fulfilling all the communication tasks, it is also the task of the communication unit 8 to provide further activities that can be used as standard for different measuring principles. These activities are, for example, conversion into different units, linearization, en-or messages, limit-value messages, current output activation, etc.

The communication unit 8 communicates via a serial bus 141a, 14b, 14c with the process control station 9. The communication unit 8 is of a standard configuration Such that it can communicate with the remote process control station 9 by means of different transmission standards 10, 11, 12, according to the selected interface 14a, 14b, 14c. In the case represented, the transmission standards are the ProfiBus PA 10, the HART Protocol 11 or the FieldBus Foundation Protocol 12. In the case shown in FIG. 1, the communication takes place via the HART Protocol 11.

The communication unit 8 can be connected to the display/input unit 17 via a communication unit/display unit interface 16. By means of the display/input unit 17, the operating personnel can have process variables displayed, or make configurational changes to the system.

Figure 2:
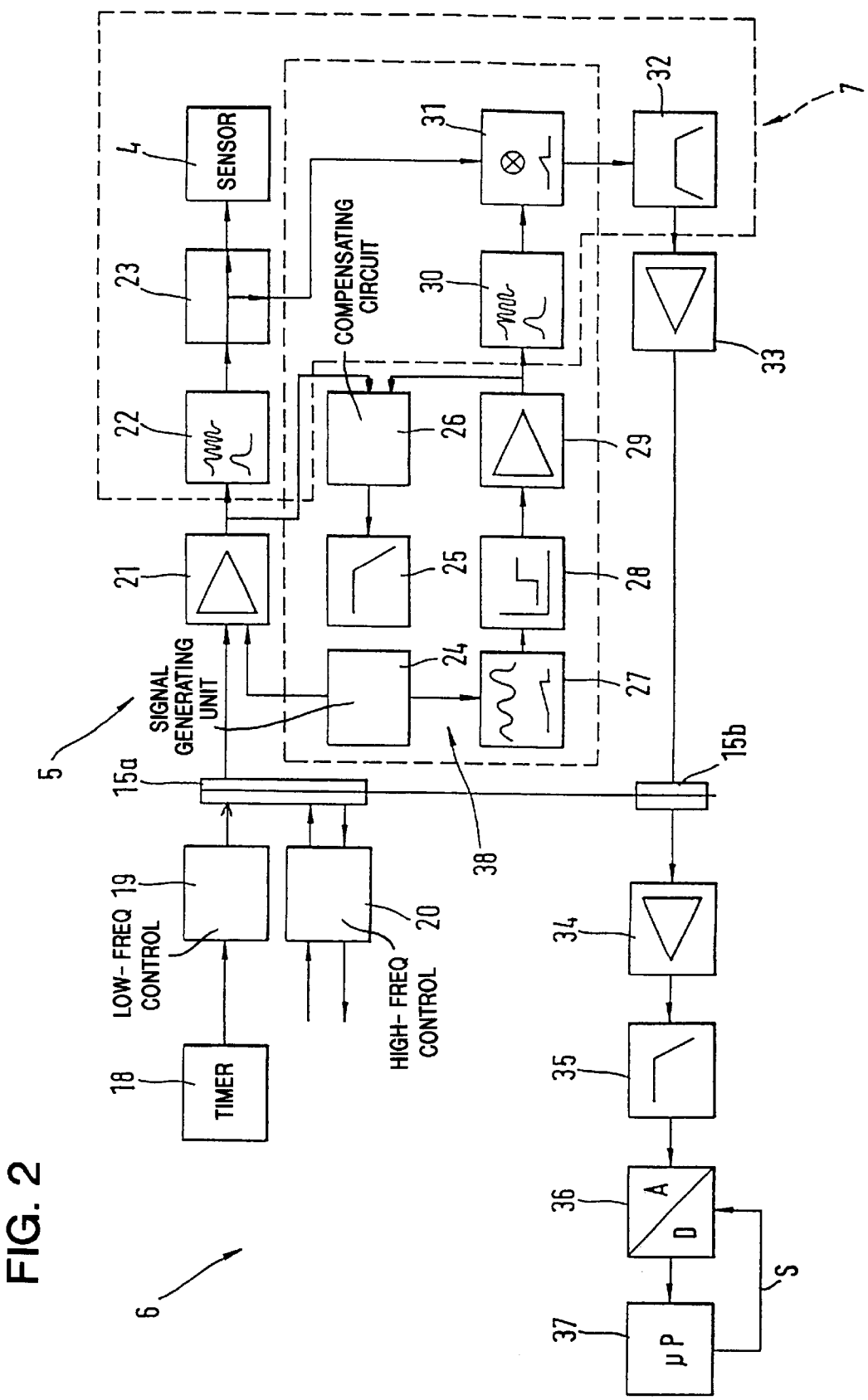

Referring to FIG. 2, a block diagram of the application unit 5 and the evaluation unit 6 according to a preferred embodiment of the apparatus according to the invention is shown. The application unit 5 and the evaluation unit 6 are connected to each other via the interface 15; 15a, 15b. According to the invention, the control of the measuring signals is performed by an interface 15 of the same design for different types of sensors 4. If an ultrasound sensor is used as the sensor 4, the low-frequency signals, which are generated and provided by the timer circuit 18 and the control circuit 19, can be further processed directly by the application unit 5. The control signal made available by the electronic components 18, 19 already contains the transmit frequency and the transmit pulse duration.

Since in the case of use of a microwave sensor the measuring signals lie in the GHz range, for the reasons mentioned above the measuring signals are transformed into the low-frequency range. For this purpose, a high-frequency module 38 is digitally switched on and off via a control unit 20 and the interface 15a. The actual transmit frequency is generated in the high-frequency module 38. In order to signal that the high-frequency module 38 is ready for measuring after switching on, a digital signal is returned, which is used for synchronization and the starting of the reading-in cycle. The high-frequency module 38 is described in more detail below.

Depending on the sensor 4 used, the application unit 5 is consequently differently configured. First, for the case in which an ultrasound sensor is connected to the apparatus according to the invention. Activated via the interface 15, the measuring signals lying in the kHz range are passed to a driver circuit 21. The measuring signals are passed via a signal shaper 22 and a duplexer filter 23 to the sensor 4 which emits the measuring signals via the antenna 39 in the direction of the medium 2 of which the process variable is to be determined. The duplexer filter 23 in this case is given the task of protecting the receiving circuit 7b from excessive transmit pulse voltage and of performing impedance matching between the sensor 4 and the receiving circuit 7b. In the case of a microwave sensor and a TDR sensor there is incidentally impedance matching in addition to the duplexer filter 23.

The sampled echo signals are sent via a bandpass filter 32 and an amplifier 33 via the application unit/evaluation unit interface 15b to the evaluation unit 6. As already described above, the evaluation unit 6 is configured in such a way that it is virtually identical for all possible methods based on a delay-time evaluation. Virtually means here that, in the case of TDR measuring signals, it is possible to dispense with a logarithmic amplifier 34. The reason for this is that both the freely emitted ultrasound measuring signals and the freely emitted microwave measuring signals have a high dynamic range because of the relatively strong attenuation in air.

Once the logarithm of the ultrasound measuring signals has been taken by the logarithmic amplifier 34, they are sent via a low-pass filter 35 to an analog/digital converter 36. The digitized measurement data are sent to a microprocessor 37, which determines the filling level of the medium 2 in the container 3 on the basis of the measurement data by using one of the sufficiently known methods of evaluation, for example evaluation of the envelope curve.

Figure 3:
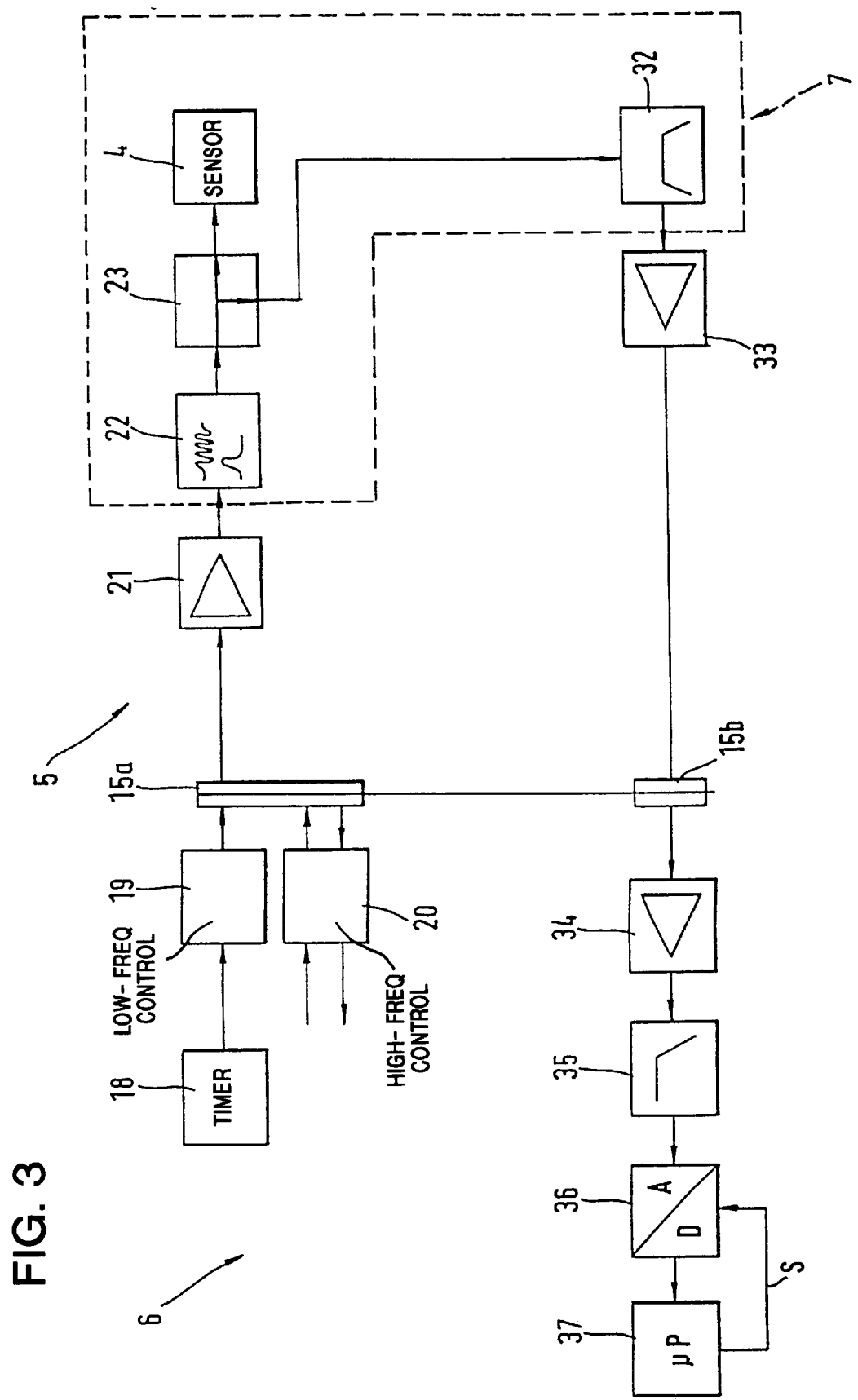
FIG. 3 shows a block diagram of a preferred embodiment of the apparatus according to the invention without the high frequency module.

The application unit 5 can also be designed to be of a standard construction for all types of sensor. However, in the case where the application unit 5 is used with acoustic sensors 4, the high-frequency module 38, described below, represents a superfluous and relatively expensive additional assembly. Consequently, if it is already known at the time of production that the application unit 5 and the evaluation unit 6 will exclusively be used with acoustic sensors 4, the high-frequency module 38 is preferably not integrated into the application unit 5 in order to reduce cost. FIG. 2 shows a block diagram with the high-frequency module 38, and FIG. 3 shows a block diagram without the high-frequency module 38. The standard evaluation unit 6 is the same in both Figures, however the application unit 5 is greatly simplified in FIG. 3 by the absence of the high-frequency module 38 which also reduces the cost of the application unit 5. The system in FIG. 2 can be used with both high-frequency and low-frequency sensors 4, while the system in FIG. 3 is just for use with low-frequency sensors 4.

As already mentioned before, high-frequency measuring signals are transformed into the low-frequency range by the high-frequency module 38. In the example shown in FIG. 2, the high-frequency module 38 is made up of the following components: a signal-generating unit 24, a low-pass filter 25, a compensating circuit 26, an oscillator/sawtooth generator 27, a delay circuit 28, an amplifier 29, a signal shaper 30 and a mixer or a sample-and-hold circuit 31. A main component part of the high-frequency module 38 is the time-delay circuit 28, at the input of which there is the transmitting clock, which is provided by the signal-generating unit 24 and the control unit 20. A high-frequency module that can be used in connection with the present invention is disclosed, for example, by DE 29 23 963.

In the case shown, the sawtooth generator 27 is set with a constant time dilation factor. This is obtained from the slope of the sawtooth or from the oscillator frequency. Although the time dilation factor varies according to the measuring principle used, it is always constant. The method with a variable sawtooth generator is likewise possible, in order to realize the subrange measurement with variable measuring resolution; however, this method can be used only in conjunction with a TDR sensor and a microwave sensor. For ultrasound, a method deviating from this would have to be chosen, which would run counter to the basic idea of the present invention, that is of bringing about maximum possible standardization.

To get around this problem, constant time dilation factors are chosen for the high-frequency methods of measurement. To be able to continue to handle all methods of measurement equally, the setting of the sampling rate and of the measuring range is performed respectively in the low-frequency range by the activation of the A/D converter 36. The setting takes place by means of an activation signal S from the microprocessor 37 to the AID converter 36.

The sampled echo signals are passed via the amplifier 29 and the signal shaper 30 to a first input of the sample-and-hold circuit 31 or the mixer 31. The reflected echo signals are available via the duplexer filter 23 at a second input of the sample-and-hold circuit 31.

During operation, measuring signals are generated preferably periodically with the transmitting clock frequency; the reflected echo signals are sent to the sample-and-hold circuit 31. There, a sampling pulse is superimposed on each echo signal and a resultant overall signal is recorded. The overall signal is filtered by means of a downstream bandpass filter 32 and amplified by means of the amplifier 33. The overall signals are sent via the interface 15b to the standard-configured evaluation unit 6.

A preferred method for determining the filling level of the medium 2 in the container 3 is for the evaluation unit 6 to evaluate a useful echo signal, which represents the portion of the measuring signal reflected at the surface of the medium 2, with respect to a system-dependent reference echo signal. The system-dependent reference echo signal represents the reflections sensed on the measuring signal due to transitions at or within the transmitting unit, due to structures or build-ups within the container 3, or due to other interference sources. The evaluation unit 6 uses the reflections in the reference echo signal to determine a useful echo signal from which the reflection due to the surface of the medium 2 can be determined.

According to one evaluation method, the evaluation unit 6 samples the measuring signals influenced by the medium 2 within a first measuring range at a first sampling frequency, and samples the measuring signals influenced by the medium 2 within a second measuring range at a second sampling frequency. The first sampling frequency by the evaluation unit 6 corresponds to a first distance resolution, and the second sampling frequency corresponds to a second distance resolution of the measuring signals. The measuring ranges and the sampling frequencies are chosen such that the following two conditions are simultaneously satisfied: the second measuring range is a subrange of the first measuring range, and the second sampling frequency is greater than the first sampling frequency. This method provides a relatively coarse distance measurement at the first sampling frequency and a finer distance measurement at the second sampling frequency. Additional sampling frequencies and measuring ranges can be used. The relatively coarse measurement is used during filling or when the surface of the medium 2 changes rapidly. The relatively fine measurement within a subrange increases the distance resolution and is used when the filling surface of the medium 2 is calm. The evaluation unit 6 can switch back and forth between the relatively coarse and relatively fine resolutions as desired.

The entire measuring range between the minimum filling level and the maximum filling level of the medium 2 in the container 3 can be used as the first measuring range, and a selected range in the vicinity of the surface of the material 2 can be used as the second measuring range. Having the first measuring range as the entire measuring range provides an overview of the entire range which includes all echo signals including the interference echo signals.

Although the invention has been described in detail with reference to certain preferred embodiments, variations and modifications exist within the scope and spirit of the present invention as described and defined in the following claims.

We claim:

1. An apparatus for determining a physical process variable of a medium comprising:
    a sensor of a sensor type having a transmitting unit which transmits measuring signals in the direction of the medium and a receiving unit which receives echo measuring signals influenced by the interaction with the medium;
    an application unit which is dependent on the sensor type of the sensor, the application unit accepting the echo measuring signals and providing measurement data, the measurement data being independent of the sensor type of the sensor, and
    an evaluation unit which is substantially independent of the sensor type of the sensor, the evaluation unit accepting the measurement data and determining the physical process variable using a delay-time method.

2. The apparatus as claimed in claim 1, further comprising a communication unit which is independent of the sensor type of the sensor, the communication unit being capable of data exchange with a remote process control station.

3. The apparatus as claimed in claim 2, wherein the communication unit communicates with the process control station via a serial bus, and the communication unit is configured for data exchange by means of different transmission standards.

4. The apparatus as claimed in claim 1, wherein the sensor is of the sensor type which wirelessly transmits electromagnetic waves or acoustic waves as the measuring signals element.

5. The apparatus as claimed in claim 1, further comprising a conducting element operably coupled to the sensor and adapted to guide the measuring signals between the sensor and the medium, wherein the sensor is of the sensor type which transmits electromagnetic waves or acoustic waves as the measuring signals via the conducting element.

6. The apparatus as claimed in claim 1, in which the sensor is of the sensor type which wirelessly transmits the measuring signals.

7. The apparatus as claimed in claim 1, further comprising a high-frequency module which, when the sensor is of the sensor type which generates electromagnetic waves as the measuring signals, transmits the measuring signals having a high-frequency, receives the echo measuring signals having a high frequency, and transforms the echo measuring signals received at a high frequency into the measurement data having a low frequency.

8. The apparatus as claimed in claim 7, wherein the application unit includes the high-frequency module.

9. The apparatus as claimed in claim 1, wherein the process variable is the filling level of the medium in a container or wherein the process variable is the flow of the medium through a line.

10. The apparatus as claimed in claim 2, wherein the process variable is the filling level of the medium in a container or wherein the process variable is the flow of the medium through a line.

11. The apparatus as claimed in claim 3, wherein the process variable is filling level of the medium in a container or wherein the process variable is the flow of the medium through a line.

12. The apparatus as claimed in claim 4, wherein the process variable is the filling level of the medium in a container or wherein the process variable is the flow of the medium through a line.

13. The apparatus as claimed in claim 7, wherein the process variable is the filling level of the medium in a container or wherein the process variable is the flow of the medium through a line.

14. The apparatus as claimed in claim 8, wherein the process variable is the filling level of the medium in a container or wherein the process variable is the flow of the medium through a line.

15. The apparatus as claimed in claim 1, further comprising an interface between the application unit and the evaluation unit, wherein, when the sensor is of the sensor type which generates acoustic waves as the measuring signals, the application unit is further operable to receive a transmit frequency and a transmit pulse duration via the interface and transfer the transmit frequency and the transmit pulse duration to the transmitting unit.

16. The apparatus as claimed in claim 7, further comprising an interface between the application unit and the evaluation unit, wherein, when the sensor is of the sensor type which generates acoustic waves as the measuring signals, the application unit is further operable to receive a transmit frequency and a transmit pulse duration via the interface, and transfer the transmit frequency and the transmit pulse duration to the transmitting unit and, when the sensor is of the sensor type which generates electromagnetic waves as the measuring signals, the high-frequency module is activated via the interface.

17. The apparatus as claimed in claim 1, wherein the evaluation unit samples the echo measuring signals within a first measuring range at a first sampling frequency, the first sampling frequency defining a first distance resolution of the echo measuring signals, and in which the evaluation unit samples the echo measuring signals within a second measuring range at a second sampling frequency, the second sampling frequency corresponding to a second distance resolution of the echo measuring signals, the second measuring range being a subset of the first measuring range, and the second sampling frequency being greater than the first sampling frequency.

18. The apparatus as claimed in claim 4, wherein the evaluation unit samples the echo measuring signals within a first measuring range at a first sampling frequency, the first sampling frequency defining a first distance resolution of the echo measuring signals, and in which the evaluation unit samples the echo measuring signals within a second measuring range at a second sampling frequency, the second sampling frequency corresponding to a second distance resolution of the echo measuring signals, the second measuring range being a subset of the first measuring range, and the second sampling frequency being greater than the first sampling frequency.

19. The apparatus as claimed in claim 7, wherein the evaluation unit samples the echo measuring signals within a first measuring range at a first sampling frequency, the first sampling frequency defining a first distance resolution of the echo measuring signals, and in which the evaluation unit samples the echo measuring signals within a second measuring range at a second sampling frequency, the second sampling frequency corresponding to a second distance resolution of the echo measuring signals, the second measuring range being a subset of the first measuring range, and the second sampling frequency being greater than the first sampling frequency.

20. The apparatus as claimed in claim 17, wherein the evaluation unit determines the filling level of the medium in a container by evaluating a useful echo signal with respect to a reference echo signal, the useful echo signal representing the portion of the echo measuring signal reflected at the surface of the medium, the reference echo signal representing the portion of the echo measuring signal due to interference reflections.

21. The apparatus as claimed in claim 17, wherein the evaluation unit uses an entire measuring range as the first measuring range, the entire measuring range spanning between a minimum filling level and a maximum filling level of the medium in a container, and wherein the evaluation unit uses a selected range corresponding to a useful echo signal as the second measuring range, the useful echo signal representing the portion of the echo measuring signal reflected at the surface of the medium.

22. The apparatus as claimed in claim 17, wherein the evaluation unit uses an entire measuring range as the first measuring range, the entire measuring range spanning between a minimum filling level and a maximum filling level of the medium in a container, and wherein the evaluation unit uses a selected range corresponding to a reference echo signal as the second measuring range, the reference echo signal representing the portion of the echo measuring signal due to interference reflections.

* * * * *